(12) United States Patent
Belissent

(10) Patent No.: US 6,799,276 B1
(45) Date of Patent: Sep. 28, 2004

(54) METHOD AND APPARATUS FOR RESTRAINING CONNECTION REQUEST STREAM ASSOCIATED WITH HIGH VOLUME BURST CLIENT IN A DISTRIBUTED NETWORK

(75) Inventor: Jacques E. Belissent, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 887 days.

(21) Appl. No.: 09/604,553

(22) Filed: Jun. 26, 2000

(51) Int. Cl.[7] ................................................ G06F 13/00
(52) U.S. Cl. ........................................ 713/201; 709/223
(58) Field of Search ............................... 713/200, 201; 709/223, 224

(56) References Cited

U.S. PATENT DOCUMENTS

| | | | | |
|---|---|---|---|---|
| 4,769,810 A | * | 9/1988 | Eckberg et al. | 370/232 |
| 6,055,578 A | * | 4/2000 | Williams et al. | 709/253 |
| 6,219,712 B1 | * | 4/2001 | Mann et al. | 709/235 |
| 6,222,856 B1 | * | 4/2001 | Krishnan et al. | 370/468 |
| 6,252,851 B1 | * | 6/2001 | Siu et al. | 370/236 |
| 6,473,793 B1 | * | 10/2002 | Dillon et al. | 709/223 |
| 6,600,721 B2 | * | 7/2003 | Edholm | 370/232 |
| 6,654,344 B1 | * | 11/2003 | Toporek et al. | 370/230 |
| 6,690,645 B1 | * | 2/2004 | Aweya et al. | 370/230 |

FOREIGN PATENT DOCUMENTS

EP      0932282 A2      7/1999      ........... H04L/12/56

OTHER PUBLICATIONS

International Search Report in corresponding PCT application PCT/US 01/16698.

* cited by examiner

Primary Examiner—Gregory Morse
Assistant Examiner—Minh Nguyen
(74) Attorney, Agent, or Firm—Beyer Weaver & Thomas, LLP

(57) ABSTRACT

According to the present invention, method, apparatus, and computer readable medium for restraining a connection request stream from a burst client are disclosed. In one embodiment, in a client/server computer environment, a method for restraining a connection request stream associated with a high volume connection request burst client is disclosed. a connection request is received at a beginning of a throttling interval m+1, where the throttling interval m+1 is subsequent to a throttling interval m. A throttling interval m+1 wait time is calculated based upon a slow down threshold associated with the requesting client, an interval m connection request count for the requesting client, wherein the interval m connection request count is the total number of connection requests received during the interval m for the requesting client, and an interval m wait time. A throttling interval m+1 connection request count is set to zero and the server computer waits for the throttling interval m+1 wait time before accepting the request.

17 Claims, 5 Drawing Sheets

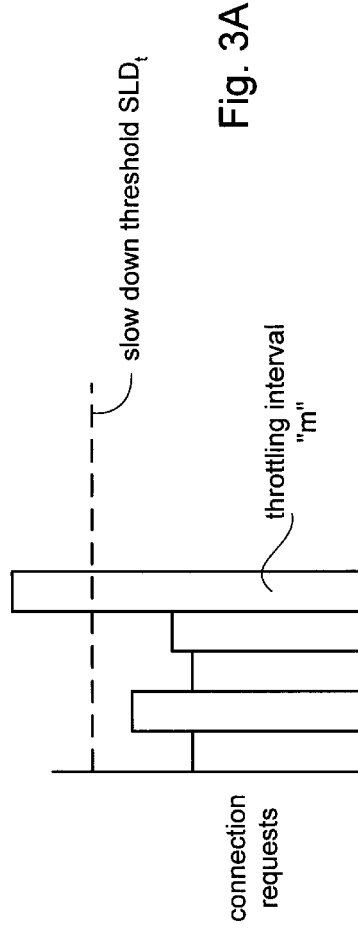
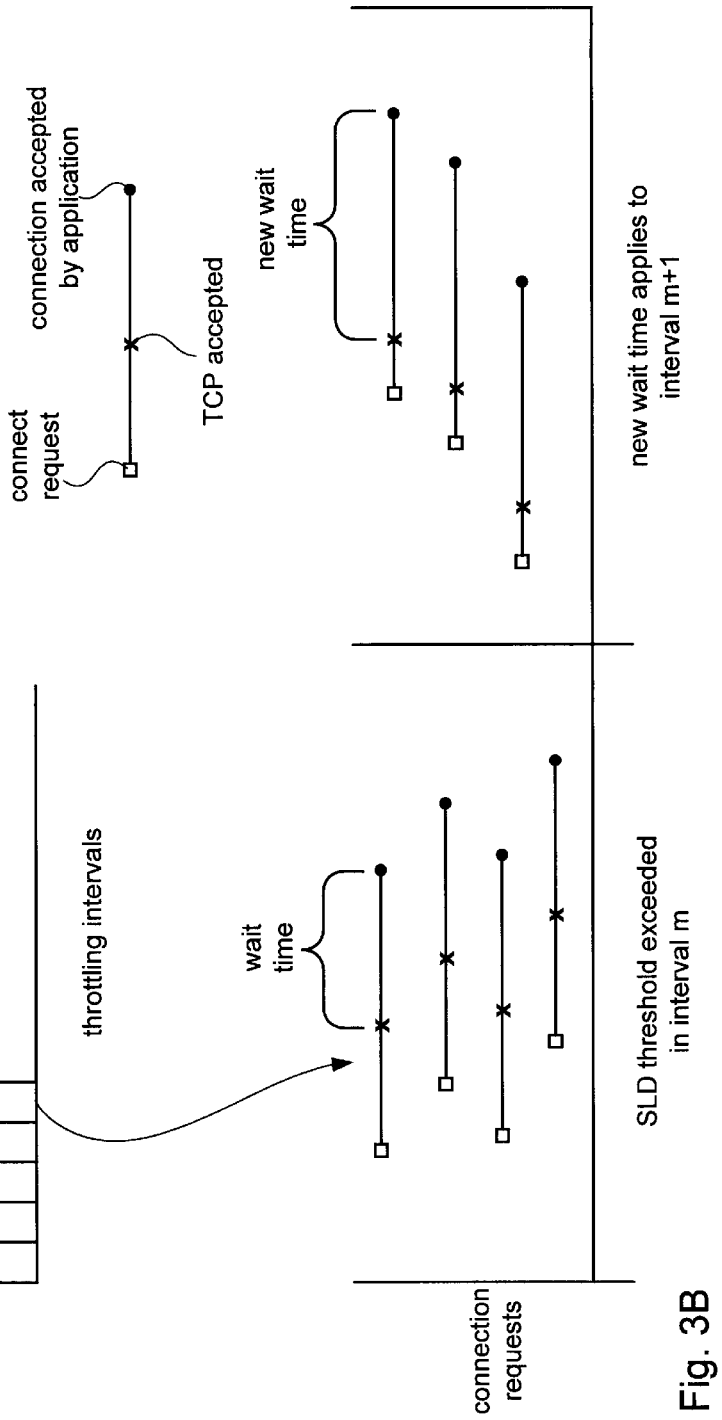
Fig. 3A
Fig. 3B

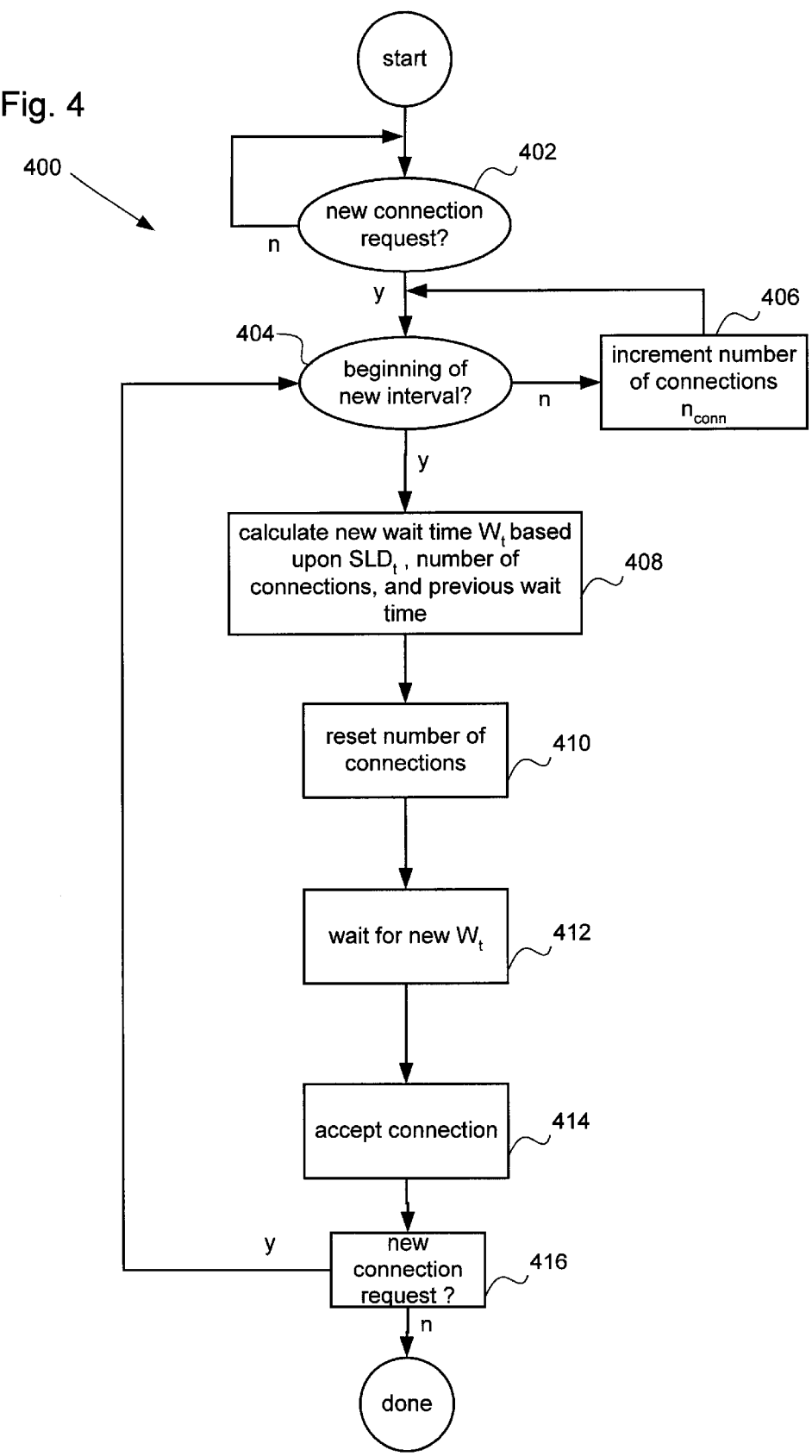

METHOD AND APPARATUS FOR RESTRAINING CONNECTION REQUEST STREAM ASSOCIATED WITH HIGH VOLUME BURST CLIENT IN A DISTRIBUTED NETWORK

FIELD OF THE INVENTION

The present invention relates in general to client/server data communication systems and more particularly, the present invention is directed towards a method and apparatus that restrains a connection request stream associated with a high volume burst client in a distributed network.

BACKGROUND OF THE INVENTION

Computer systems are well known in the art and have become a business staple and are also found in many homes. One feature available to the business world is that of using electronic mailing (e-mail) to send and receive messages and other information to and from one another in a business setting. Similarly, home computers, such as desk tops or laptops, and other information devices, such as personal digital assistants (PDAs), allow telecommuting such that a user can connect to the user's work server and down load and upload messages.

The e-mail system allows clients of a network system, which is maintained by a server system, to send messages or data from one user to another. In order to minimize disk space and requirements as well as to maximize functionality and consistency of the electronic mailing engine used in the network system, the engine is typically located on the server and is merely accessed by a client in order to send messages or retrieve messages to or from another user or client on the server system. In this way, the client system typically allows the user to perform such operations as composing, updating, and sending messages while the server in such a system provides, in part, a server based message repository as well as providing message transmission and reception functions for the user at the client level.

One such email system is described with reference to FIG. 1 showing a messaging system 100 suitable for large, distributed networks such as the Internet or large scale intranet systems. The system 100 typically includes a central server 102 resident in a computer system 104 that can take the form of a mainframe system as well as a distributed type computing system. When the system. 100 is a messaging system, such as an email system, the central server 102, as the central email server, is coupled to an interface, such as a firewall 106, that mediates the flow of information between the mail server 102 and its it clients represented as client 108, client 110, and client 112. Typically, when the client 108, for example, desires to establish a channel to the server 102, the client 108 will generate a request to open a connection to the mail server 102 by any one of a variety of transports and protocols that are submitted directly by the requesting client 108, via, for example, TCP/IP as an SMTP message from an Internet system. Such a connection request can be submitted by using a dial-up modem using the PhoneNet protocol, DECnet as a MAIL-11 message, DECnet as an SMTP message, UUCP, an X.400 transport, SNA, and so on. For instance, at sites with an Internet connection, Internet addresses are normally routed through an SMTP over TCP/IP channel, however, at sites with only a UUCP connection, Internet addresses would instead be routed through a UUCP channel.

Once the connection request has been accepted, a channel is open between the requesting client 108 and the server computer 102 allowing for the transfer of data. In some cases, however, the requesting client 108 can inadvertently disrupt the operations of the server 102 by generating a large number of connection requests within a relatively short length of time (i.e., connection request stream) referred to as a connection request burst. A connection request burst is defined as those situations where a legitimate client (referred to as a burst client) as part of its normal operations occasionally generates a short term, high volume connection request stream. One of the problems with the short term connection request burst is that it has the potential to disrupt the server 102 by forcing it to direct an inordinate amount of connection resources to the burst client 108 thereby having the effect of overwhelming requests from other clients, such as client 110 and 112.

A conventional approach to dealing with the short term, burst client 108 is to first identify those clients as burst clients by comparing the client's current connection request rate a pre-determined threshold. Once identified as a burst client, the burst client is temporarily blocked from making any additional connection requests of the server so as to allow other clients to have access to the server 102.

Unfortunately, however, blocking the connection request stream of the burst client 108, even for a short period of time, can have substantial adverse effects on the burst client 108.

Therefore, it would be desirable to have an improved method and apparatus in a distributed network for providing a burst client access to a server computer without adversely affecting other clients coupled to the server.

SUMMARY OF THE INVENTION

To achieve the foregoing, and in accordance with the purpose of the present invention, method, apparatus, and computer readable medium for providing connection requests to a high volume burst client in a distributed network are disclosed. In one embodiment, in a client/server computer environment, a method for restraining a connection request stream associated with a high volume connection request burst client is disclosed. A connection request is received at a beginning of a throttling interval m+1, where the throttling interval m+1 is subsequent to a throttling interval m. A throttling interval m+1 wait time is calculated based upon a slow down threshold associated with the requesting client, an interval m connection request count for the requesting client, wherein the interval m connection request count is the total number of connection requests received during the interval m for the requesting client, and an interval m wait time. A throttling interval m+1 connection request count is set to zero and the server computer waits for the throttling interval m+1 wait time before accepting the request.

In a preferred embodiment, the throttling interval m+1 wait time is related to a difference between the interval m connection request count for the interval m and the slow-down threshold for that requesting client.

In another embodiment, in a client/server computer environment, an apparatus for restraining a connection request stream associated with a high volume connection request burst client is disclosed. The apparatus includes a connection request receiving unit for receiving a connection request at a beginning of a throttling interval m+1, where the throttling interval m+1 is subsequent to a throttling interval m. A memory unit coupled to the connection request receiving unit arranged to store data associated with a slow down threshold, an interval m connection request count for the requesting client, and an interval m wait time. The apparatus further includes a processor coupled to the memory arranged to calculate a throttling interval m+1 wait time based upon the slow down threshold associated with the requesting client, the interval in connection request count for the requesting client and further arranged to set a throttling interval m+1 connection request count to zero. A request throttler coupled to the processor is also included that is arranged to direct the server computer to wait the throttling interval m+1 wait time before accepting the request.

In yet another embodiment, a computer readable media including computer program code for restraining a connection request stream associated with a high volume connection request burst client is disclosed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A and FIG. 3B illustrates throttling a connection request stream based upon a slowdown threshold in accordance with an embodiment of the invention.

FIG. 4 illustrates a flowchart detailing a process for deriving a wait time in accordance with an embodiment of the invention.

DETAILED DESCRIPTION OF THE PREFERRED EMBODIMENTS

Figure 1:
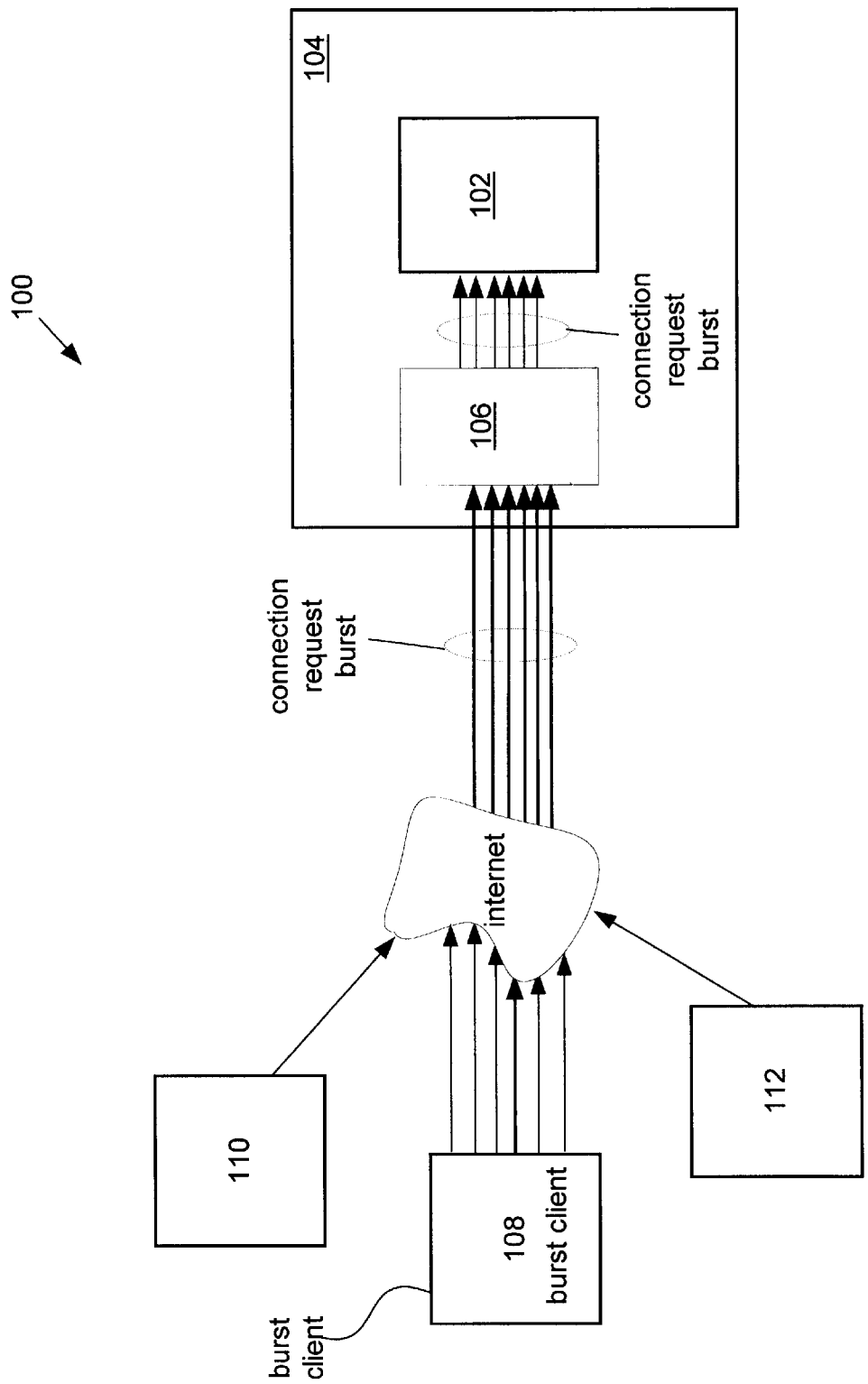
FIG. 1 showing a burst client in a messaging system.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Broadly speaking the invention describes an IP throttler that is an Internet standards-based protocol and system for restraining, but not halting, connection requests from a burst client so as to maintain burst client access to the server computer without unduly affecting access of other clients. The IP throttler is designed to restrain connection requests by a burst client by slowing down, but not blocking, the processing of connections from the burst client's IP address to the server to a connection rate that the server can handle without adversely affecting other clients coupled thereto. In order to determine whether a particular client is a burst client, the IP throttler records all connecting IP addresses thereby allowing the server to ascertain a connection request rate for each client. A connection request rates is then tabulated for each client (based upon their particular IP address, for example) and compared to a slowdown threshold associated with that particular IP address. The slowdown threshold provides the maximum number of connections per time interval (such as a throttling interval) from a particular IP address that the server is willing to accept without slowing down new incoming connections for that IP address.

If the incoming connection rate from the particular IP address always stays below the slowdown threshold, no throttling is applied to this IP address. If, however, during the previous throttling interval, there are connections in excess of the slowdown threshold, then what is referred to as a wait time is used to delay the incoming connection request stream from only the burst client during a next throttling interval. In particular, the wait time is related to the number of connection requests (hits) above the slowdown threshold (referred to as a slowdown rate). For example, in one implementation, the slowdown rate represents how many hourly connections in excess of the slowdown threshold will cause one second of wait time.

In the following description, frameworks and methods of providing an apparatus and system for restraining the connection request stream from a burst client to a server computer in a distributed environment are described. Such distributed environments are exemplified by those networks that utilize SMTP requests and responses. Although the invention will initially be described in terms of a multithreaded, object oriented computing system implemented using SMTP requests and responses, it should be noted that the present invention can be used in any system that is capable of handling well defined requests and responses across a distributed network.

It should also be noted that although the invention is described in terms of the Internet, any distributed network could be suitably employed to implement any desired embodiment of the invention.

The invention will now be described in terms of an electronic messaging system, such as an email system, having a server computer that is part of a large network of computers typical of, for example, the Internet coupled to a client computer capable of generating any number of connection requests within a particular time interval.

Figure 2:
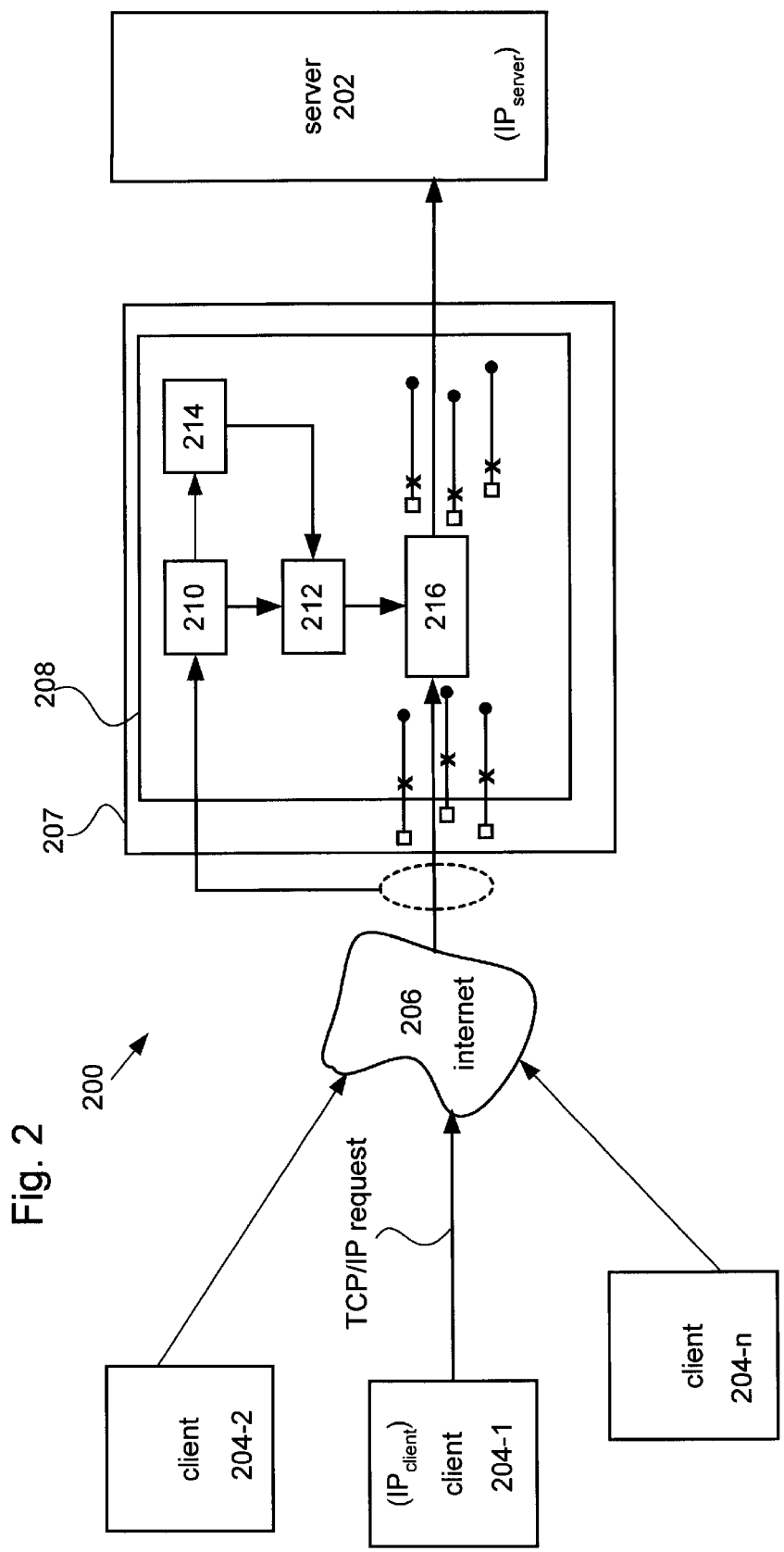
FIG. 2 shows a messaging system in accordance with an embodiment of the invention.

Referring now to FIG. 2, a messaging system 200 in accordance with an embodiment of the invention is described. The messaging system 200 includes a server computer 202 coupled to client computers 204-1 through 204-n by way of an interconnected network of computers 206, which in this example, is the Internet. When the client computer 204-1, for example, desires to communicate with the server computer 202 in order, for example, to send an email message, the client computer will generate a connection request that is typically based upon the well known TCP/IP protocol. As well known in the art, TCP (Transmission Control Protocol) is a method used along with the Internet Protocol (IP) to send data in the form of message units between computers over the Internet. While IP takes care of handling the actual delivery of the data, TCP takes care of keeping track of the individual units of data (referred to as packets) that a message is divided into for efficient routing through the Internet.

In the most widely installed level of the Internet Protocol, an IP address is a number (currently a 32 bit number) that identifies each sender or receiver of information that is sent in packets across the Internet. For example, the Internet Protocol part of TCP/IP includes an IP address associated with the receiver in the message and sends it to the IP address that is obtained by looking up the domain name in the Universal Resource locator in an HTTP (i.e., WEB page) type request or in the e-mail address in an email-type request. The recipient can see the IP address of the Web page requester or the e-mail sender and can respond by sending another message using the IP address it received. An IP address has two parts: the identifier of a particular network on the Internet and an identifier of the particular device (which can be a server or a workstation) within that network.

Therefore, in the arrangement shown in FIG. 2, the client computer 204-1 has associated with it a unique IP address ($IP_{client}$) as well as does the server computer 202 ($IP_{server}$). In order to request a connection to the server computer 202, the client computer 204-1 generates a TCP/IP based connection request that includes both the client IP address $IP_{client}$ and the server IP address, $IP_{server}$. Once the connection request has been successfully routed to the server computer 202, a firewall 207 included in or coupled to the server computer 202 monitors all incoming connection requests from all the client computers 204-1 through 204-n. In the described embodiment, the firewall 207 includes an IP throttler unit 208 that is used to restrain the connection request stream from an identified burst client. The IP throttler unit 208 includes a connection request monitor 210 arranged to monitor the number of connection requests received by a particular requesting client based upon the requesting client's unique IP address. A processor unit 212 coupled to the connection request monitor 210 is configured to count the number of connection requests for a particular requester based upon its associated IP address per unit of time, also referred to as a throttling interval. A memory 214 coupled to the processor unit 212 is used to store various threshold values that are used to determine whether or not a particular client can be characterized as a burst client, and if so, how to prevent the burst of connection requests from adversely affecting the operation of the server computer 202 or the crowding out the other clients 204-2 through 204-n.

For example, with reference to FIG. 2, FIG. 3A and FIG. 3B, time is divided into intervals (one such interval is called a throttling interval) in which the number of connections per client IP address is recorded in the memory 214, a slowdown threshold $SLD_t$ provides the maximum number of connections per unit of time (such as an hour) from one IP address that the server computer 202 is willing to accept without slowing down new incoming connections from the burst client. If the incoming connection rate from one IP address always stays below the slowdown threshold $SLD_t$, no throttling is applied to the stream of connection requests coming from a particular IP address. If, however, during the previous throttling interval, the connection request rate is in excess of the slowdown threshold $SLD_t$, a restrictor unit 216 coupled to the processor 212 slows down the connection request rate stream by what is referred to as a wait time. In a preferred embodiment, the wait time is based on the slowdown rate that represents how many connections per unit time (such as an hour) in excess of the slowdown threshold will cause one second of wait time.

In one embodiment, after a throttling interval has ended, the wait time associated with an IP address is calculated/ updated according to the number of connections coming from this IP address during this throttling interval. It should be noted that in the described embodiment, each of the clients 204-1 through 204-n have their own slowdown threshold $SLD_t$ that can be set according to the needs of a particular system. For example, if the client 204-1 is a low volume type client, it can have a slowdown threshold $SLD_{t1}$ that represents a low number of connection requests. However, if, for example, the client 204-2 is a client having a wide variation of connection requests per unit time depending upon various factors, such as time of day, etc., then it can have a slowdown threshold $SLD_{t2}$ that provides for those intervals of high volume connection requests without sacrificing server access of the lower volume clients, such as 204-1.

Still referring to FIG. 2, FIG. 3A, and FIG. 3B, in a specific implementation, time is divided into throttling intervals m in which the number of connections per client IP address is monitored by the monitoring unit 210 and recorded in the memory 214. If a particular client's connection request rate for a throttling interval m is greater than the slowdown threshold $SLD_t$, for that client as determined by the processor unit 212, the processor unit 212 will direct the restrictor unit 216 to slow down the incoming connection request stream by a wait time $W_t$ for the next throttling interval m+1. In this way, the burst client maintains server access, although at a lower rate, without adversely affecting server access to other clients. For example, in FIG. 3B, the interval between the TCP accept and connection accepted by the application is increased by the wait time $W_t$ in the interval m+1.

FIG. 4 shows a flowchart detailing a process 400 for throttling a connection request stream for a burst client in accordance with an embodiment of the invention. The process 400 begins at 402 determining is a new connection request has been received. When a new connection request has been received, a determination is made whether or not it is the beginning of a new interval at 404. If it is determined that it is not a beginning of a new interval, then the number of connections $n_{conn}$ is updated at 406, otherwise, a new wait time Wt is calculated at 408. At 410, the number of connections $n_{conn}$ is reset and the connection request is delayed based upon the new wait time Wt at 412. At 414, the connection is accepted by the application, and a 416 a determination is made whether or not a new connection request has been received. If a new connection request has been received, then control is passed back to 404, otherwise processing stops.

Figure 5:
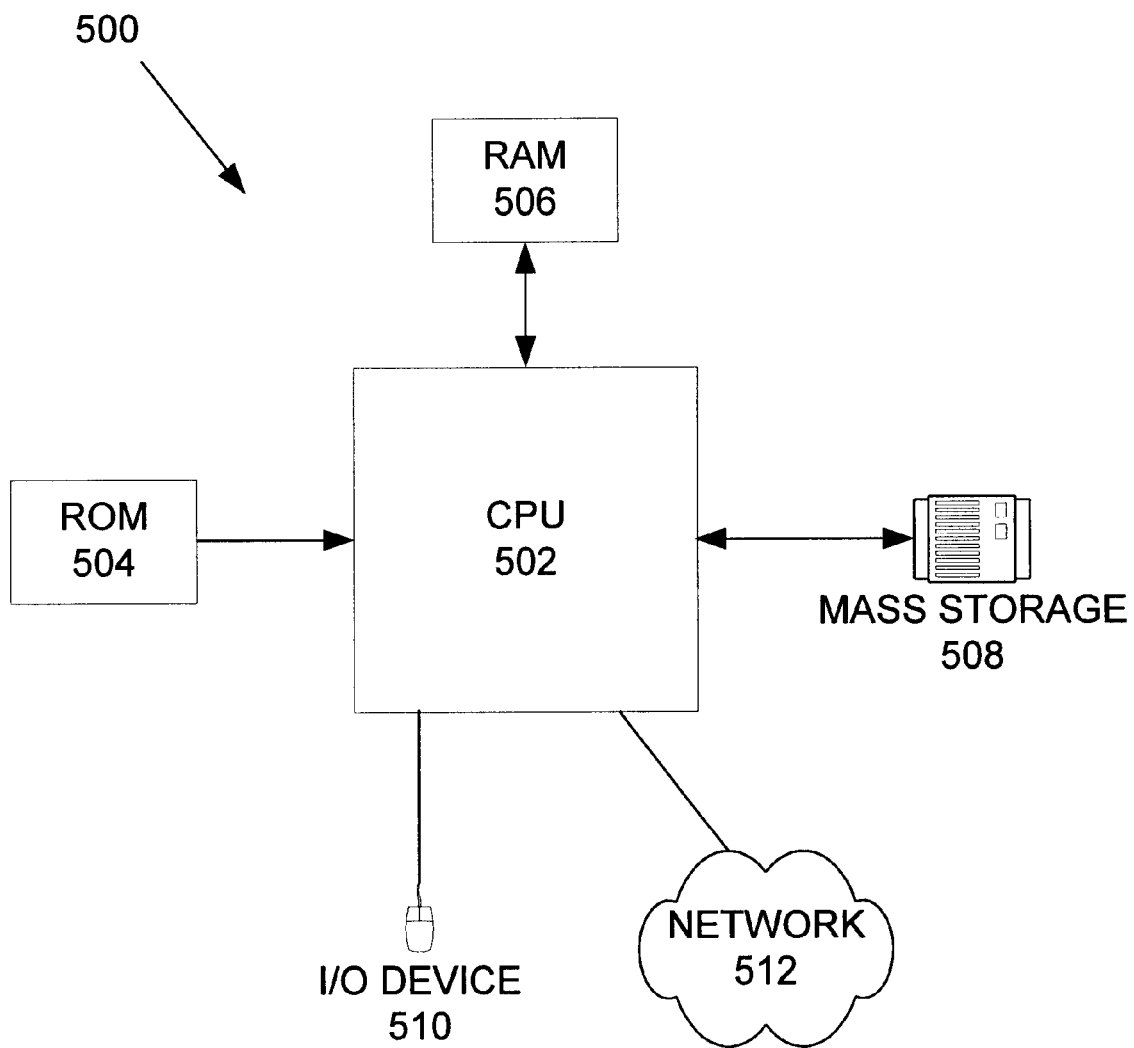
FIG. 5 illustrates a typical, general-purpose computer system suitable for implementing the present invention.

FIG. 5 illustrates a typical, general-purpose computer system suitable for implementing the present invention. As is well known in the art, ROM acts to transfer data and instructions uni-directionally to the CPUs 502, while RAM is used typically to transfer data and instructions in a bi-directional manner. CPUs 502 may generally include any number of processors. Both primary storage devices 504, 506 may include any suitable computer-readable media. A secondary storage medium 508, which is typically a mass memory device, is also coupled bi-directionally to CPUs 502 and provides additional data storage capacity. The mass memory device 508 is a computer-readable medium that may be used to store programs including computer code, data, and the like. Typically, mass memory device 508 is a storage medium such as a hard disk or a tape which generally slower than primary storage devices 504, 506. Mass memory storage device 508 may take the form of a magnetic or paper tape reader or some other well-known device. It will be appreciated that the information retained within the mass memory device 508, may, in appropriate cases, be incorporated in standard fashion as part of RAM 506 as virtual memory. A specific primary storage device 504 such as a CD-ROM may also pass data uni-directionally to the CPUs 502.

CPUs 502 are also coupled to one or more input/output devices 510 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 502 optionally may be coupled to a computer or telecommunications network, e.g., an Internet network or an intranet network, using a network connection as shown generally at 512. With such a network connection, it is contemplated that the CPUs 502 might receive information from the network, or might output information to the network in the course of performing the above-described method steps. Such information, which is often represented as a sequence of instructions to be executed using CPUs 502, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. Operations may also be removed or added without departing from the spirit or the scope of the present invention.

Although the methods for restraining a connection request stream for a high volume burst client in a distributed network in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. In a client/server computer environment, a method for restraining a connection request stream associated with a high volume connection request burst client, comprising:
   receiving an interval m+1 connection request a throttling interval m+1, where the throttling interval m+1 is subsequent to a throttling interval m,
   calculating a throttling interval m+1 wait time based upon,
      a slow down threshold associated with the requesting client,
      an interval m connection request count for the requesting client, wherein the interval m connection request count is the total number of connection requests received during the interval m for the requesting client, and
      an interval m wait time; setting a throttling interval m+1 connection request count to zero; waiting the throttling interval m+1 wait time; and accepting the interval m+1 connection request by a server computer.

2. A method as recited in claim 1, further comprising:
   receiving an interval m connection request during the throttling interval m;
   resetting the interval m connection request count when the interval m connection request is the first connection request received during the interval m; and
   incrementing the interval m connection request count.

3. A method as recited in claim 1, wherein the interval m+1 wait time is related to a difference between the requesting client's interval m connection request count and the requesting client's slowdown threshold.

4. A method as recited in claim 1, wherein the interval m+1 connection request is a TCP/IP type connection request.

5. A method as recited in claim 1, wherein each of the clients are identified based upon an IP address uniquely associated with each client.

6. A method as recited in claim 5, wherein the slowdown threshold associated with a particular requesting client is related to an expected interval m connection request count for the particular requesting client.

7. A method as recited in claim 4, where the interval m+1 wait time for the TCP/IP type connection request is a duration of time between a TCP accepted event associated with the TCP/IP type connection request and a corresponding connection accepted by application event associated with the TCP/IP type connection request.

8. A method as recited in claim 1, wherein the server is an electronic unit server.

9. In a client/server computer environment, an apparatus for restraining a connection request stream associated with a high volume connection request burst client, comprising:
   a connection request receiving unit for receiving an interval m+1 connection request during a throttling interval m+1, where the throttling interval m+1 is subsequent to a throttling interval m;
   a memory unit coupled to the connection request receiving unit arranged to store data associated with,
      a low down threshold associated with the requesting client,
      an interval m connection request count for the requesting client, wherein the interval m connection request count is the total number of connection requests received during the interval m for the requesting client, and
      an interval m wait time;
   a processor coupled to the memory arranged to calculate a throttling interval m+1 wait time based upon,
      the slow down threshold associated with the requesting client,
      the interval m connection request count for the requesting client, wherein
      the interval m connection request count is the total number of connection requests received during the interval m for the requesting client, and arranged to set a throttling interval m+1 connection request count to zero; and
   a request throttler coupled to the processor arranged to direct the server computer to wait the throttling interval m+1 wait time before accepting the interval m+1 connection request.

10. An apparatus as recited in claim 9, wherein when an interval m connection request is received during the throttling period m, the processor resets the interval m connection request count when the interval m connection request is the first connection request received during the interval m and increments the interval m connection request count.

11. A method as recited in claim 9, wherein interval m+1 wait time is related to a difference between the requesting client's interval m connection request count and the requesting client's slowdown threshold.

12. A method as recited in claim 9, wherein the interval m+1 connection request is a TCP/IP type connection request.

13. A method as recited in claim 9, wherein each of the clients is identified based upon an IP address uniquely associated with each client.

14. A method as recited in claim 13, wherein the slowdown threshold associated with a particular requesting client is related to an expected interval m connection request count for the particular requesting client.

15. A method as recited in claim 12, wherein the interval m+1 wait time for the TCP/IP type connection request is a duration of time between a TCP accepted event associated with the TCP/IP type connection request and a corresponding connection accepted by application event associated with the TCP/IP type connection request.

16. A method as recited in claim 9, wherein the server is an electronic mail server.

17. A computer readable media including computer program code for restraining a connection request stream associated with a high volume connection request burst client, said computer readable media comprising:

computer program code for receiving an interval m+1 connection request during a throttling interval m+1, where the throttling interval m+1 is subsequent to a throttling interval m, computer program code for calculating a throttling interval m+1 wait time based upon, a slow down threshold associated with the requesting client, an interval m connection request count for the requesting client, wherein the interval m connection request count is the total number of connection requests received during the interval m for the requesting client, and an interval m wait time;

computer program code for setting a throttling interval m+1 connection request count to zero;

computer program code for waiting the throttling interval m+1 wait time; and computer program code for accepting the interval m+1 connection request by a server computer.

\* \* \* \* \*

UNITED STATES PATENT AND TRADEMARK OFFICE
CERTIFICATE OF CORRECTION

PATENT NO. : 6,799,276 B1
DATED : September 28, 2004
INVENTOR(S) : Jacques E. Bellisent It is certified that error appears in the above-identified patent and that said Letters Patent is hereby corrected as shown below:

Column 1,
Line 50, change "its it clients" to -- its n clients --.

Column 3,
Line 4, change "interval in connection" to -- interval m connection --.

Column 7,
Line 38, change "request a" to -- request during a --.

Column 8,
Line 8, change "where the" to -- wherein the --.
Line 14, change "recited m" to -- recited in --.
Line 15, change "unit server" to -- mail server --.
Line 25, change "a low down" to -- a slow down --.
Line 55, change "wherein interval" to -- wherein the interval --.

Signed and Sealed this

Twenty-first Day of December, 2004

JON W. DUDAS
*Director of the United States Patent and Trademark Office*